April 7, 1936.  G. B. BROWN ET AL  2,036,913

SOUND ABSORBING ARTICLE

Filed Aug. 6, 1932

INVENTORS
George B. Brown.
Harry E. Holcomb.
BY D. N. Halstead
ATTORNEY

Patented Apr. 7, 1936

2,036,913

UNITED STATES PATENT OFFICE 2,036,913

SOUND ABSORBING ARTICLE

George B. Brown, Somerville, N. J., and Harry E. Holcomb, Stratford, Conn., assignors to Johns-Manville Corporation, New York, N. Y., a corporation of New York Application August 6, 1932, Serial No. 627,696

4 Claims. (Cl. 106—18)

This invention relates to a structural unit, particularly to one including exfoliated mineral material and a porous binder.

The invention comprises the product resulting from forming a mixture of granules of exfoliated mica or the like with an adhesive composition that is viscous but of low concentration of actual adhesive and adapted to give a porous adhesive film in the finished product, shaping the mixture, and then hardening the adhesive in the shaped mixture.

It is an object of the invention to provide a lightweight thermal insulating and acoustical unit comprising granules, provided with voids of preferred size and shape for sound absorption, embedded in a porous binder composition that is itself permeable to sound.

Other objects and advantages will appear as the description of the invention progresses.

The invention is illustrated in the drawing in which

In the figures like reference characters denote like parts.

Figure 1:
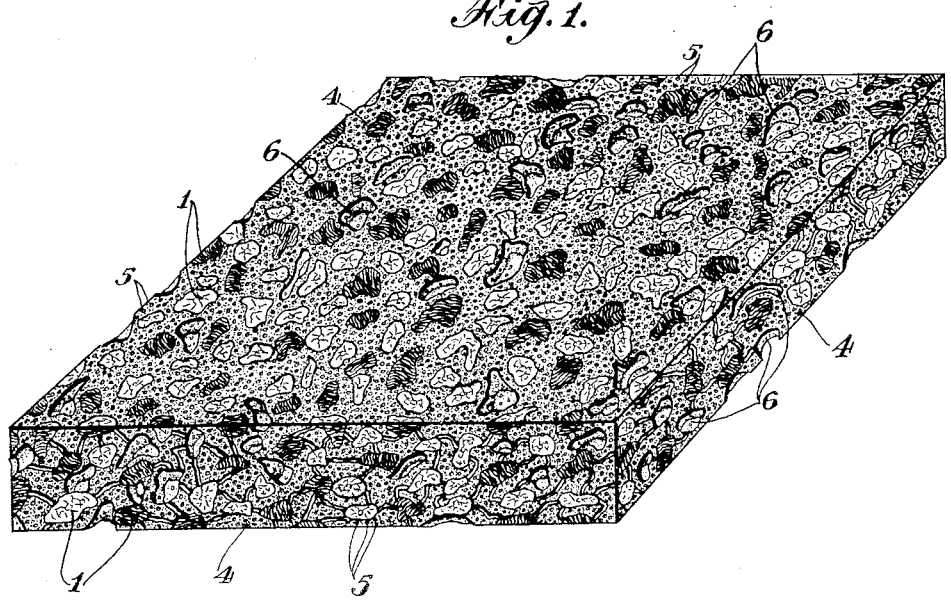
Fig. 1 shows a perspective view of a structural unit or block made in accordance with the invention.
Figure 2:
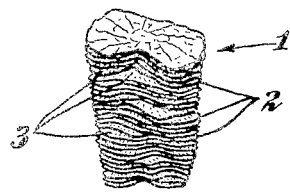
Fig. 2 shows an enlarged perspective view of a granule of type used in the structure shown in Fig. 1.

Thus, 1 denotes granules that are provided with a multiplicity of laminæ 2 lying in approximately parallel planes and defining between them voids or spaces 3 of the type illustrated that are thin, that is, very thin in proportion to their length and breadth. A large proportion of the voids communicate individually with opposed exterior surfaces as, for example, with the surfaces at the left and right and also front and back of the granule illustrated in Fig. 2. The granules consist suitably of exfoliated mineral material, preferably micaceous. We have used to advantage exfoliated or expanded vermiculite, made by heating the mineral in granulated form to a high temperature, to cause removal of water and separation of the scales to give an exfoliated structure, somewhat resembling the leaves of a partly opened book. Such exfoliated micaceous material is light in weight and is to be distinguished from dense material that may be made by mechanical separation of mica into sheets.

The adhesive, or binder 4, that adheres together the granules 1, should be applied to the granules in a form that will bridge over the voids and preserve them, in such manner as to leave them unfilled with the adhesive after the adhesive composition is hardened. Also, the adhesive should be one that, during hardening, develops pores or spaces within itself. A desirable adhesive or binder composition is one that is viscous but of relatively low concentration of actual adhesive. Such a binder may be made by emulsifying an aqueous solution of an adhesive substance, suitably a protein, such as glue or casein, with a volatile liquid that is immiscible therewith, such as gasoline or benzol. Organic adhesives are particularly adapted to be made into such a viscous emulsion.

A binder composition that may be used is illustrated by the following specific example, which describes the making of a casein adhesive that has been found to be particularly suitable for use with granules of exfoliated micaceous material.

In this example, as elsewhere in the specification or claims, all proportions are expressed as parts by weight.

The casein used in the adhesive may be a commercial grade, such as one adapted to give an aqueous solution of relatively low viscosity and sold as "B—1 casein", in granular or meal form. Of such casein, 25 parts are swollen, by being soaked for approximately one-half hour in 32 parts of water. The swollen casein is then dissolved, or formed into a fairly uniform mixture, with a solution of approximately 2 parts sodium hydroxide in 7 parts of water. This dissolving requires some time for its completion, usually 15 to 20 minutes, and is facilitated by agitating the swollen casein with the sodium hydroxide solution until practically all grains of casein disappear. There may be then added about 2.5 parts of an alum, to decrease the combustibility of the non-volatile portion of the finished composition. The solution of casein and sodium hydroxide in water is then mixed with or emulsified with approximately 115 parts of a mixture of substantially equal volumes of water and low-boiling gasoline. This mixing is accomplished by means of thorough agitation, as, for example, that produced by a high speed propeller. The mixing is more readily made at an elevated temperature. For this reason the mixture of water and gasoline, which is added to the casein solution, is suitably at a temperature of about 60° C. at the time of being added. When the warmed mixture of water and gasoline is stirred into the alkaline, aqueous solution of casein, a very pronounced change occurs. There is produced what appears to be an almost uniform, milky product that is viscous, in fact, more viscous than was the solution of casein in the aqueous alkali before the additional water and gasoline were added. Although the improved composition, diluted with the water and gasoline mixture, is sufficiently viscous to adapt it for use as a viscous adhesive, a typical composition of this kind is of low concentration of actual adhesive, say, only 15 to 25 ounces of casein for approximately a gallon of the finished mixture.

For the casein and gasoline used in the above example, there may be substituted glue and benzol, respectively, although the casein mixture has outstanding properties for the present purpose. For the sodium hydroxide, other alkalies may be substituted. In place of the gasoline or benzol there may be used another liquid that its not miscible with water or a solvent for the adhesive substance and that is readily volatile.

When a mixture of granules with an adhesive or binder mixture of the type described is shaped and then subjected to hardening, as, for example, by evaporation of volatile materials, the binder composition undergoes very pronounced shrinkage because of the low content or concentration of actual non-volatile binder therein. This shrinkage and the volatilization of immiscible material, such as gasoline, develops shrinkage spaces and pores 5 in the binder itself and provides sound-permeable channels that give communication between a surface of the article and the voids within the granules.

There may be provided also relatively large cavities 6, that is, cavities of much larger size than the voids within the granules or the pores in the binder. These cavites may extend from an outer surface of the article inwardly and make possible painting of the outer surface of the article containing such cavities, without bridging over the cavities and closing them against the admission of incident sound to the inner portion of the article.

A method of making the product of the present invention includes the shaping of a plastic mass, as by extrusion of it through a die. There may be made, first, a casein adhesive of the type described above. The adhesive is then mixed with exfoliated vermiculite or the like. Of the adhesive composition or binder, there may be used such as quantity as to give 8 to 25 parts of actual casein to 60 to 90 parts of the vermiculite. For making a composition that, by shaping and hardening, will give a lightweight durable sound absorbing block of great effectiveness, there have been used to advantage mixtures containing approximately 80 parts of exfoliated vermiculite to 20 parts of actual casein.

The exfoliated vermiculite may be used in the form of granules of various sizes, as, for example, particles between 2 and 30-mesh. For obtaining a preferred degree of lightness and permeability, there have been used granules of size between 2 and 4-mesh.

The mixture of adhesive and granules may have various proportions of volatile materials, including, for example, water and gasoline, to give a rather stiff plastic mass suitable for extrusion and holding its shape when properly supported after extrusion. The mixture so made is placed in an extrusion machine and extruded in a convenient manner. However, the usual screw pressure used in extrusion of ceramic articles and the like, may be substituted by extrusion under air pressure or an intermittent plunger action, in order to avoid fracturing the exfoliated granules by the screw equipment. The mass is forced through a die of desired size and shape of opening. The extruded material is received on a supporting base or platform that may move in synchronized relationship to the extruded product. If the extruded product is a flat ribbon it may be received on a flat belt or platform.

If it is desired to make semi-tubular shapes adapted to be fitted together as pipe covering, the die in the extrusion machine should be semi-tubular in cross section and the receiving platform should have a semi-cylindrical shape of interior, adapted to fit the extruded semi-tube of plastic material.

After being extruded and while still supported to avoid distortion of the shaped mass, the material is cut to suitable lengths and submitted to a hardening treatment. Thus, the shaped mass is hardened by the evaporation of volatile material therefrom. The rate of evaporation may be controlled and made very slow at the start, in order to avoid disruption; the shaped material may be allowed to stand for several hours or longer at atmospheric temperature and then transferred to a drying chamber which is warmed gradually to a temperature above the boiling point of the volatile materials, say, to about 250 to 300° F., but below the decomposition temperature of the organic adhesive.

During this hardening treatment the casein emulsion undergoes development of spaces or pores, including vapor escape channels 5 through which volatile ingredients escape to an outer surface of the article and, from the surface, to the atmosphere.

In the extrusion process described above, granules of exfoliated vermiculite in surface portions adjacent to a surface of the die become oriented in such a manner as to offer a minimum of friction to movement through the die. In the oriented granules the laminæ are approximately parallel to the surface. The orientation affects the properties of the product. It affects the appearance. It orients the particles in predominating proportion with the laminæ of the granules in the outer portion of the article arranged substantially parallel to the outer surface thereof, and provides laminations in a direction at right angles to the direction of heat flow through an insulating pipe covering, for example, when the product is in use around the steam pipe; since the various laminæ are reflectors of radiant energy, orientation with the planes of the laminæ transverse to the direction of heat flow is favorable to the insulating value of the article. Furthermore, it is possible to paint over a surface of particles so oriented, without closing the entrances to the various voids on an edge of the particles.

The extrusion may be made with a plastic of such consistency or thickness that it will not smoothly fill the extrusion die. The result is an extruded product in which there are large surface irregularities or cavities of the type designated by the reference character 6.

It should be pointed out that binder compositions of the type described are slippery. This property of the binder composition, coupled with the low coefficient of the friction of the granules themselves, particularly when oriented as described, gives a mixture well adapted to extrusion with a minimum of difficulty.

In a modification of the process including shaping and hardening, the extrusion step may be replaced by simple molding. Thus, a stiff plastic mixture may be shaped in molds of desired size and shape. After being molded, the mixture may be hardened as described above. It will be understood that simple molding does not give all the desirable properties obtained by extrusion, such as orientation of surface granules, as described above.

Various shapes of articles may be made, in addition to the semi-tubular shape described above. Thus, there may be made slabs. A slab suitable for acoustical construction may be 1 to 2 inches thick and 1½ x 1½ feet or larger in dimensions of face.

The products made as described are light in weight and effective in thermal insulation. Typical products have an overall density corresponding to 10 to 16 pounds, frequently about 12 pounds, per cubic foot. The voids within the granules of exfoliated vermiculite have a large resistance to the passage of gas therethrough, in comparison with the resistance offered by a tubular space of equal area of cross section, and are particularly adapted to the absorption of sound. Furthermore, there has been found a very high efficiency of absorption of sound of the particular frequencies which it is most desirable, commercially, to absorb. There has been found an absorption of approximately 60% of sound of frequency 512 cycles per second, and an absorption above 90%, in a typical case 97%, at a frequency of 1024 cycles. These absorption data were obtained with flat slabs, 1 inch thick, that had been brush-painted with nine coats of white paint over the faces exposed to the incident sound. This high efficiency, after painting, is significant as showing that painting does not destroy the efficiency in sound absorption.

The porosity of the adhesive, as referred to herein, relates to pores existing in the adhesive itself, as distinguished from conventional spaces existing between adhesively coated granules. For example, the preferred adhesive, deposited by evaporation from an emulsion of the type described, contains pores within the residual material. These pores are permeable to sound and preserve communication between the voids within the granules and the exterior surface of the finished article, the pores and the said voids in the finished article being freely accessible to sound incident upon the surface thereof.

The details that have been given are for the purpose of illustration and not restriction, and many variations therefrom may be made without departing from the spirit and scope of the invention.

What we claim is:

1. A sound-absorbing article comprising granules provided with closely spaced voids that are very thin in proportion to their length and breadth and a binder of the type of a porous casein composition disposed over the granules and adhering them into a unit, the binder being provided with small, closely spaced pores communicating with the said voids and with an outer surface of the article, whereby the article is made permeable to incident sound.

2. A sound-absorbing article comprising granules of the type of exfoliated vermiculite provided with closely spaced voids that are very thin in proportion to their length and breadth and a binder of the type of a porous casein composition disposed over the granules and adhering them into a unit, the binder being provided with small, closely spaced pores corresponding to vapor-escape channels.

3. A sound-absorbing article including void-containing granules of the type of exfoliated vermiculite and a protein binder composition disposed over the granules and adhering them into a unitary product, the surface portions of the said article being provided with relatively large cavities extending at intervals inwardly from the outer surface of the article and being adapted to remain accessible to incident sound after painting of the said outer surface and the binder being provided with closely spaced pores communicating with the said cavities and with the voids in the granules.

4. A sound-absorbing article including granules of exfoliated micaceous material including closely spaced laminæ defining therebetween sound-absorbing voids communicating individually with opposed exterior surfaces of a granule and a binder adhering the granules into a unitary product, the granules in the outer portion of the article being oriented in predominating proportion with the said laminæ extending substantially parallel to the general plane of the outer surface of the article and the binder including closely spaced pores communicating with the said voids and with an outer surface of the article.

GEORGE B. BROWN.
HARRY E. HOLCOMB.